United States Patent [19]

Hongu et al.

[11] 4,302,552

[45] Nov. 24, 1981

[54] MICROCELLULAR POLYURETHANE VIBRATION ISOLATOR

[75] Inventors: Tatsuya Hongu; Toshio Suzuki; Yoshihiko Ogawa, all of Tokyo, Japan

[73] Assignee: Nisshin Spinning Co., Ltd., Tokyo, Japan

[21] Appl. No.: 165,078

[22] Filed: Jul. 1, 1980

[51] Int. Cl.$^3$ .................. C08G 18/14; C08G 18/48
[52] U.S. Cl. .................. 521/176; 248/634; 260/DIG. 46; 521/914
[58] Field of Search .............. 260/DIG. 46; 521/176, 521/914; 248/634

[56] References Cited

U.S. PATENT DOCUMENTS

| | | | |
|---|---|---|---|
| 3,188,302 | 6/1965 | Lorenz | 521/176 |
| 3,476,933 | 11/1969 | Mendelsohn | 260/2.5 |
| 3,591,532 | 7/1971 | Abercrombie et al. | 521/176 |
| 3,887,505 | 6/1975 | Demon et al. | 521/914 |
| 4,210,728 | 7/1980 | Patton et al. | 521/176 |

OTHER PUBLICATIONS

Peter Sherwood Associates, Polyurethane Foams, Elastomers & Intermediates, 1977–1980 (Feb. 1978) New York.

Lowe et al, Jour. of Cellular Plastics, Jan. 1965, pp. 121–130.

Klapproth, "Propylene Glycols & Polypropylene Glycol", *Chemical Economics Handbook,* Manlow Park, CA (Mar. 1978).

Gaylord, Polyethers, Part I, Interscience, N.Y. (1963) pp. 321–323.

Saunders et al., Polyurethanes Part I, Krieger, Huntington, N.Y. (1978), pp. 32–45.

Sanyo Chemical Industries (Japan) Feb. 1973 12 pages.

*Primary Examiner*—H. S. Cockeram
*Attorney, Agent, or Firm*—Sherman & Shalloway

[57] ABSTRACT

A vibration isolator consisting essentially of a microcellular polyurethane elastomer having a bulk density of 0.3–0.9 g/cm$^3$, said polyurethane elastomer obtained by reacting in the presence of water as the blowing agent (a) an organic polyisocyanate, (b) a polyether polyol having an average number of functional groups of 2.5–3.5 and a number average molecular weight of 4500–8500, and (c) a chain extender, in such a ratio that the NCO index is 90–110 and the concentration of the chain extender, based on the total weight of the three components (a), (b) and (c), is $(0.4–2.0) \times 10^{-3}$ equivalent/gram.

12 Claims, No Drawings

MICROCELLULAR POLYURETHANE VIBRATION ISOLATOR

This invention relates to a vibration isolator that is effective in damping vibration or preventing the transmission of vibration, and particularly to a vibration isolator consisting of a microcellular polyurethane elastomer which can be effectively used in damping vibrations that are set up under high loads or can be effectively used in isolating the transmission of vibration that takes place between the source of the vibration and the members that support said source.

It has been known hitherto to use as vibration isolators for damping or isolating vibration those materials consisting principally of natural rubber or synthetic rubbers. For example, a rubber vibration isolator is used for preventing the transmission of the rotary and reciprocating motions of such equipment as compressors, presses, etc. to their supporting bed. These vibration isolators are designed to achieve the isolating effect by transmitting the vibratory energy from the vibration producing source to a rubbery elastic member where the effect of isolating the transmission of vibration is achieved by the deformation of the elastic member and internal loss.

In using this type of vibration isolator for the purpose of damping or isolating the transmission of vibration, the prevention of vibration or its transmission can be achieved by insertion of a vibration isolator (rubber vibration isolator) between the source of vibration and its supporting members when the displacement by the vibration is only in a uniaxial direction, say the direction of acceleration of gravity. However, the vibration of the vibratory source usually occurs in two or more axial directions, for example in triaxial directions with the direction of acceleration of gravity as one of the axes, and thus a vibratory source that is supported on a vibration isolator is in an extremely instable state as a result of the vibratory accelerations in directions other than the direction of acceleration of gravity. To wit, in the case of a vibratory source having a high center of gravity, there is the danger of its toppling. Again, it becomes impossible to secure its position as a result of a thrusting force in a horizontal direction incident to the vibration. In other words, it is difficult to firmly unite an elastic member such as a vibration isolator with a vibratory source or its supporting bed.

As one solution, there has been conceived a method consisting of covering the bottom of a rigid base such as a concrete sheetlike member with a vibration isolator followed by embedding this in a recess of the supporting bed and thereafter installing the vibratory source atop this base and securing it thereto. The vibratory source and the base can easily be firmly united by means of such binding hardwares as bolts. On the other hand, the base is held in the surface of the bed as a result of its having been embedded in a recess of the supporting bed. In this case the vibration isolator at the bottom of the base supports the load consisting of the vibratory source and the vibration isolator at the sides of the base and in contact with the sides of the recess counters the thrusting force of the vibration in the horizontal direction.

It was however found that a serious problem arose when this method was carried out. Since the vibration isolator at the bottom of the base is embedded in a recess of the bed surface according to the above method, deformations in directions other than that resulting from the load in a perpendicular axis to the base and the bed surface are substantially constrained. Hence, under these conditions, the volumetric changes of the vibration isolator will be coerced by the vibration of the base. On the other hand, the conventional vibration isolators which consist principally of natural rubber or synthetic rubbers have a dense structure, and thus difficulty is experienced in bringing about a change in their volume. Hence, the vibration isolator being in a state in which its volumetric deformation is constrained loses its functions as a vibration isolator.

In accordance with our experiment, when a square vibration isolator consisting principally of chloroprene rubber having a thickness of 25 mm and whose one side was 20 cm was compressed between flat plates in a free state without restraining its volumetric change, a compressive strength of 520 kg was required in compressing it 1 mm, and a compressive strength of 1300 kg was required in compressing it 2.5 mm. In this case, the spring constant between the strains 4%–10% is calculated to be 5.2 tons/cm, but the spring constant rises to 20.8 tons/cm when the compression is carried out with constraint such as to cause a reduction in the volume by the compression. The rise in the spring constant thus reaches a value of four times. It is thus impossible to achieve damping vibration or prevention of the transmission of vibration by using the conventional vibration isolators in a state such as described.

The conventional vibration isolator also has the drawback that there is a change in its properties at the time of compression as a result of a change of its geometrical configuration. To wit, when the aforementioned chloroprene rubber-type vibration isolator, which is a platelike member having the dimensions 20 cm×20 cm×25 mm is compressed while allowing its free deformation, the spring constant per unit area is 13 kg/cm$^3$ between the strains 4%–10%, as hereinbefore indicated. However, when a member having the dimensions 50 cm×50 cm×25 mm is used, and the measurement is made in the same manner, the spring constant per unit area shows a value of 24 kg/cm$^3$, and the rise corresponds to 1.8 times. This is believed to be for the reason that in the case of the conventional vibration isolators there occurs a markedly different volumetric deformation depending upon the shape of the vibration isolator even when the compression is carried out while allowing the free deformation of the vibration isolator. This poses an exceedingly troublesome problem from the standpoint of designing a vibration isolator.

Our researches with the view of solving the problems indicated hereinbefore led to the discovery that a polyurethane elastomer as specified below, i.e., a microcellular polyurethane elastomer having a bulk density of 0.3–0.9 g/cm$^3$ that is obtained by reacting in the presence of water as the blowing agent (a) an organic polyisocyanate, (b) a polyether polyol having an average number of functional groups of 2.5–3.5 and a number average molecular weight of 4500–8500, and (c) a chain extender, in such a ratio that the NCO index is 90–110 and the concentration of the chain extender, based on the total weight of the three components (a), (b) and (c), is (0.4–2.0)×10$^{-3}$ equivalent/gram was extremely suitable for use as a vibration isolator, especially an isolator of vibrations that are encountered under high loads.

There is thus provided in accordance with this invention a vibration isolator consisting of the above-specified microcellular polyurethane elastomer.

The microcellular polyurethane elastomer of this invention has a bulk density of 0.3–0.9 g/cm$^3$, preferably 0.5–0.9 g/cm$^3$, and more preferably 0.65–0.85 g/cm$^3$. Hence, those having a bubble content of 10–70%, preferably 10–50%, and more preferably 15–35%, are used. In a microcellular polyurethane elastomer of this type the internal bubbles are compressed by a compressive load even under conditions where the deformation of the elastomer in directions other than the direction along the axis of the load is constrained. Hence, a volumetric deformation easily takes place, with the consequence that a great rise in the spring constant that is seen in the conventional isolators can be avoided. Similarly, under conditions where deformation is freely permitted, there is hardly any change in the spring constant per unit area even when there is a change in geometric configuration, i.e. a change in the pressure-receiving area. For example, when a microcellular polyurethane elastomer having a bulk density of 0.58 g/cm$^3$, as a plate having the dimensions 10 cm × 10 cm × 25 mm, was compressed with freedom of deformation, its spring constant per unit area between the strains 4%–10% was 4.2 kg/cm$^3$, but when this was compressed while constraining it such as to bring about a volumetric compression, the spring constant rose to 5.5 kg/cm$^3$, a value only 1.30 times. Further, when the same microcellular polyurethane elastomer was compressed under freedom of deformation but using a plate having the dimensions 50 cm × 50 cm × 25 mm, the rise in the spring constant per unit area was about 1.1 times. Thus, superior effects in absorbing vibration can be obtained by using this type of microcellular polyurethane elastomer even in those cases where the volumetric deformation is in a restricted or constrained state.

While not only the bulk density but also the physical and chemical properties of the microcellular polyurethane elastomer can be varied over a wide range by a choice of its constituent components, it goes without saying that in a case where the elastomer is to be used as a vibration isolator as in this invention the constituent components must be so chosen as to be the optimum in respect of durability and isolation properties. The makeup of the low foam polyurethane elastomer suitable for achieving the objects of the present invention will now be fully described.

The microcellular polyurethane elastomer used in this invention is formed by reacting (a) an organic polyisocyanate, (b) a polyether polyol having an average number of functional groups of 2.5–3.5 and a number average molecular weight of 4500–8500, and (c) a chain extender, in the presence of water as the blowing agent and a urethanation catalyst and, as required, a foam stabilizer.

It is extremely important that the polyether polyol used in this invention is one having an average number of functional groups of 2.5–3.5 and a number average molecular weight ranging between 4500 and 8500. When the average number of functional groups is less than 2.5, the permanent compression set of the resulting microcellular polyurethane elastomer, an important property when the elastomer is to be used as a vibration isolator, becomes great to make it unfit for use. In the case of the polyurethane elastomers that are used for shoe soles, the polyether polyols having a number of functional groups close to 2 are used in most instances, but for obtaining an elastomer for vibration isolator having a small permanent compression set that is in agreement with the object of this invention the average number of functional groups must be at least 2.5. On the other hand, when the average number of functional groups of the polyether polyol used exceeds 3.5, the resulting polyurethane elastomer not only tends to become extremely hard, but also the possibility of the rupture of the resulting elastomer by means of vibratory compression increases. Thus, the number of functional groups suitably ranges from 2.8 to 3.3. On the other hand, when the number average molecular weight of the polyether polyol is less than 4500, only a polyurethane elastomer whose vibration energy absorbing properties are especially low can be obtained. This is believed for the reason that the chemical crosslinking point density becomes high to result in the elastomer approaching the behavior of a perfect elastic body. On the other hand, when the number average molecular weight exceeds 8500, this also is undesirable since the elastic properites of the resulting polyurethane elastomer suffer to result in a tendency to plastic deformation taking place, and especially since the permanent compression set becomes great. Thus, a preferred range for the number average molecular weight of the polyether polyol to be used is one ranging from 4500 to 6500.

Usable as such a polyether polyol are those which are known per se. Included are, for example, the polyether polyols obtained by addition polymerizing an oxyalkylene compound of 2–4 carbon atoms such as ethylene oxide or propylene oxide to the lower aliphatic polyhydric alcohols of 2–6 carbon atoms such as glycerol and trimethylolpropane or to a low molecular weight active hydrogen compound containing at least two active hydrogen atoms such as ethylene diamine.

Further, for obtaining a microcellular polyurethane elastomer having good vibration isolation properties it is essential that a chain extender be used in this invention. A chain extender by reacting with the isocyanate forms by means of a urethane bond or a urea bond a hard segment that is principally an inter-hydrogen bond. It is thus an important factor controlling the properties of an elastic body. According to our studies, it was found that in combining the chain extenders with the foregoing polyether polyols the former was suitably incorporated in such an amount that when expressed as equivalent concentration of the active hydrogen contained in the chain extender per unit weight of the polyurethane elastomer to be obtained, it would be in the range $0.4 \times 10^{-3}$–$2.0 \times 10^{-3}$ equivalent/g, preferably $0.4 \times 10^{-3}$–$1.0 \times 10^{-3}$ equivalent/g. When this equivalent concentration is less than $0.4 \times 10^{-3}$ equivalent/g, the strength of the resulting microcellular polyurethane elastomer is extremely low to make it fit for practical use. On the other hand, when this concentration is higher than $2.0 \times 10^{-3}$ equivalent/g, while there is an enhancement of the strength of the resulting polyurethane elastomer, the elastomer becomes extremely hard. In addition, as a fatal defect, there is an aggravation of the permanent compression set and the repeated compression fatigue properties. It is believed that this fact indicates that an increase in the density of the physical crosslinking points such as inter-hydrogen bonds is undesirable when the elastomer is used for such purposes where it is subjected to repeated compression stresses such as for a vibration isolator.

As such chain extenders, usable are the relatively low molecular weight compounds of essentially 2–4 functionality, particularly 2 functionality, i.e. the diols and the diamines, examples of which are ethylene glycol, propylene glycol, propanediol, butanediol, hydroquinone, hydroxyethylquinone ether, methylenebis-(o-dichloroaniline), quadrol, ethylenediamine and triethanolamine, of which preferred are the straight chain alkylene diols, particularly ethylene glycol or 1,4-butanediol.

On the other hand, usable as the organic polyisocyanates are those which are usually used in the urethane elastomers. Examples are such polyisocyanates as 4,4'-diphenylmethanediisocyanate (MDI), naphthylenediisocyanate (NDI), tolylenediisocyanate (TDI) and hexamethylenediisocyanate. These can also be used as mixtures of two or more thereof. Of these polyisocyanates, preferred are the aromatic diisocyanates such as MDI, NDI and TDI, particularly preferred being MDI. Rather using MDI it its crude state, it is advantageously used in its pure state.

Again, the polyisocyanate can also be used as a precursor, i.e. a prepolymer or a semiprepolymer, condensed in advance with the foregoing polyether polyol. In either case, the organic polyisocyanate is advantageously used in an amount, expressed as the NCO index, of 90–110, preferably 95–105.

Water can be used as the blowing agent in producing the microcellular polyurethane elastomer of this invention. While the amount of the blowing agent required for obtaining the polyurethane elastomer having a bulk density of 0.3–0.9 g/cm$^3$ as intended by the instant invention can be readily determined by those skilled in the art, the amount of blowing agent usually ranges from $3.3 \times 10^{-4}$ to $4.4 \times 10^{-3}$ grams per unit weight (g) of the polyurethane elastomer to be obtained.

As the urethanation catalyst, those usually used in the urethanation reaction, i.e. the tertiary amine compounds and the organometallic compounds, can be used. Examples include such compounds as triethyleneamine, diazabicycloundecene, n-methylmorphine, N,N,-dimethylethanolamine, tin octylate and dibutyl tin laurate. While the amount of catalyst used can be varied over a wide range in accordance with the reaction speed desired, it must be suitably adjusted in accordance with the amount of polyurethane elastomer to be foamed and the atmospheric conditions (temperature and humidity). This amount can be easily determined.

The invention microcellular polyurethane elastomer can suitably contain a foam stabilizer such as a silicone-type surface active agent. It can also contain such pigments as carbon black.

The several components described hereinbefore can be reacted by methods which per se are known. For example, the liquids A and B of the following compositions, after intimate mixing, are poured into a suitable mold where foaming and cure of the elastomer is allowed to proceed. This foaming and cure can usually be performed at room temperature, but it can also be carried out while heating the mixture to a temperature up to about 70° C. The foaming and cure is completed in roughly 1–2 hours, after which the resulting elastomer can be removed from its mold.

| Composition of liquid A | |
|---|---|
| Polyether polyol (a glycerol/ propylene oxide/ethylene oxide copolymer addition product; number average molecular weight = 6500) | 1000 parts by weight |
| *-continued* | |
| Ethylene glycol (chain extender) | 0.5–20 parts by weight |
| Water (blowing agent) | 0.1–1.5 part by weight |
| Foam stabilizer (e.g. a silicone-type surface active agent) | 0.1–1 part by weight |
| Triethylenediamine (urethanation catalyst) | 0.1–0.5 part by weight |
| Composition of liquid B | |
| Polyisocyanate/polyether polyol prepolymer (e.g. an isocyanate terminated precursory condensation product of 4,4'-diphenylmethanediisocyanate and the above polyether polyol; free NCO content = 16 wt. %) | NCO Index 90–110 |

A vibration isolator consisting of a microcellular polyurethane elastomer can be thus obtained. A major portion of the bubbles in the microcellular polyurethane elastomer thus formed are independent bubbles. The desirable properties of this elastomer are as follows:

(1) Bulk density:
  0.3–0.9 g/cm$^3$, preferably 0.65–0.85 g/cm$^3$.
(2) Tensile strength:
  At least 5 kg/cm$^2$, preferably 6–15 kg/cm$^2$.
(3) Spring constant:
  At least 0.1 ton/cm, preferably 0.5–1.5 ton/cm.
(4) Permanent compression set:
  25% at the most, and preferably not more than 15%.
(5) Fatigue strength:
  2.0 mm at the most, and preferably not more than 1.0 mm.

Another superior characteristic that the vibration isolator consisting of the microcellular polyurethane elastomer provided by this invention possesses is its temperature characteristic. To wit, as can be seen from the hereinafter given examples of the invention vibration isolator, the changes in spring constant and hardness due to temperature changes are very small. In addition, it possesses superior weatherability. Hence, it is especially suitable for use outdoors where the fluctuation in temperature is especially great.

The microcellular polyurethane elastomer of this invention can demonstrate its superior effects when it is integrally formed and foamed on a base that supports a vibration producing source, for example, a concrete block, and thus achieve its intimate adhesion thereto. Or, it can be separately molded and then be secured to the vibration producing source by intimately adhering it to the base. It thus can be adhered to the bottom of the base with an adhesive, or a method can be employed in which a boxlike urethane elastomer product is molded followed by inserting the base in the so molded box.

The base having a polyurethane elastomer covering layer, the invention vibration isolator, as described above, can then be fitted in a recess in the surface of the floor where the vibration producing source is to be installed. The recess may be formed in advance in the floor surface, or an alternative procedure is to install the base having the polyurethane elastomer covering layer on a flat floor surface, after which the sides of base are packed with concrete or asphalt to form the recess. Again, it is also possible to lift the covered base temporarily from the floor surface and pack the bottom and sides of the base with concrete or asphalt. Again, it is possible to use a base not having a covering layer and a recess provided in advance in the floor surface and foam and mold the polyurethane elastomer in the recess by pouring a liquid thereof into the recess. In this case the polyurethane elastomer is integrally formed on both the base and the supporting floor surface, with the consequence that a firm adhesion can be obtained.

The vibration isolator of the invention can be used in all areas of industry for the purpose of isolating vibration or absorption of sound that accompany vibration. For example, conceivable applications are that of installing the invention vibration isolator at the bottom surface of punch presses for stamping out metals or at the underside of compressors, or that of isolating the vibration of air conditioning equipment that has been installed on the floor surface, or using it for isolating the vibration of subway tracks.

The following examples will serve to illustrate modes of practicing the present invention.

EXAMPLE 1

| Composition of liquid A | |
|---|---|
| Polyether polyol (a glycerol/propylene oxide/ethylene oxide copolymer addition product; average number of functional groups = 3.0; number average molecular weight as shown in Table 1, below) | 100 parts by weight |
| Ethylene glycol | As indicated in Table 1 |
| Water | 0.35 part by weight |
| Foam stabilizer [silicone-type surface active agent (CF 2080, a product of Toray Silicone Company)] | 0.50 part by weight |
| Triethylenediamine | 0.20 part by weight |
| Composition of liquid B | |
| Polyisocyanate/polyether polyol prepolymer (an isocyanate terminated percursory condensation product of 4,4'-diphenylmethanediisocyanate and the above polyether polyol; free NCO content = 16 wt. %) | NCO Index = 97 |

The liquids A and B of the above compositions were mixed with stirring at room temperature, after which the mixture was poured into a form having the dimensions 200×200×25 mm and foamed such that its bulk density would become 0.8 g/cm³. About one hour after the pouring, the form was removed, and the resulting panel-like test specimen was submitted to tests for its physical properties. The results of measurements of its physical properties are shown in Table 1.

TABLE 1

| | Run No. 1-1 | Run No. 1-2 | Run No. 1-3 | Run No. 1-4 | Physical property test method |
|---|---|---|---|---|---|
| Number average molecular weight of polyether polyol | 3000 | 4800 | 6600 | 9000 | — |
| Amount used of ethylene glycol (wt. part) | 2.47 | 2.29 | 2.21 | 2.16 | — |
| Physical property test items | | | | | |
| Tensile strength (kg/cm²) | 9.6 | 7.8 | 7.5 | 8.3 | (1) |
| Spring constant (ton/cm) | 1.1 | 0.83 | 0.72 | 0.60 | (2) |
| Permanent compression set (%) | 36 | 5.6 | 8.3 | 42 | (3) |

TABLE 1-continued

| | Run No. 1-1 | Run No. 1-2 | Run No. 1-3 | Run No. 1-4 | Physical property test method |
|---|---|---|---|---|---|
| Fatigue strength (mm) | 2.8 | 0.52 | 0.68 | 3.3 | (4) |

Notes.-
(1)Measured in accordance with JIS Method K6301. Dumbbell test pieces are prepared by cutting out the pieces in parallel to the foaming direction and perpendicular to the skin surface, and the measurement is made at a pulling speed of 500 mm/min.
(2)Determined in accordance with JIS Method K6385. A specimen (100 × 100 × 25 mm thick) is precompressed twice at a rate of 1 mm/min in its thickness direction. The amounts of strain at loads of 0.1 ton and 0.4 ton are determined from the load-strain curve of the third compression, and the value of the spring constant is obtained by the following equation.

Spring constant (ton/cm) = $\frac{0.4 - 0.1}{\delta(0.4) - \delta(0.1)}$ where $\delta(0.4)$ = the amount of strain (cm) at a 0.4 ton load, and $\delta(0.1)$ = the amount of strain (cm) at a 0.1 ton load.
(3)Determined in accordance with JIS Method K6301. A specimen of the dimensions 50 × 50 × 25 mm is compressed 30% and left to stand at 70° C. for 22 hours. The permanent compression set is then calculated from the resulting residual strain by the following equation.

Permanent compression set (%) = $\frac{t_0 - t_2}{t_0 - t_1}$ × 100 where $t_0$: thickness of test piece before compression; $t_1$: thickness of spacer; and $t_2$: thickness of test piece 30 minutes after the compression test.
(4)Measured in accordance with SRIS Method 3502.A specimen of the dimensions 50 × 50 × 25 mm is repeatedly compressed 10⁶ times at a frequency of 5Hz and a repeated displacement amplitude of 4 mm ± 2 mm. The amount of fatigue is then measured.

EXAMPLE 2

| Composition of liquid A | |
|---|---|
| Polyether polyol (average number of functional groups and composition as indicated in Table 2, below; weight = 4800) | 100 parts by weight |
| Ethylene glycol | As indicated in Table 2, below. |
| Water | 0.35 part by weight |
| Foam stabilizer [a silicone-type surface active agent (CF-2080, a product of Toray Silicone Company)] | 0.50 part by weight |
| Triethylenediamine | 0.20 part by weight |
| Composition of liquid B | |
| Polyisocyanate/polyether polyol prepolymer (the same as that used in Example 1) | NCO Index = 97 |

The liquids A and B of the above compositions were reacted as in Example 1 to obtain panel test pieces. The physical properties of these test pieces were measured, with the results shown in Table 2, below.

TABLE 2

| | Run No. 2-1 | Run No. 202 | Run No. 203 |
|---|---|---|---|
| Average number of functional groups of the polyether polyol used | 2(a) | 3(b) | 4(c) |
| Amount used of ethylene glycol (parts by weight) | 2.20 | 2.29 | 2.39 |
| Physical property test items | | | |
| Tensile strength (kg/cm²) | 4.2 | 8.8 | 10.2 |
| Spring constant (ton/cm) | 0.63 | 0.83 | 1.22 |
| Permanent compression set (%) | 28 | 5.6 | 31 |
| Fatigue strength (mm) | 2.2 | 0.52 | 2.4 |

Notes.
(a)Propylene glycol/propylene oxide/ethylene oxide copolymer addition product
(b)Glycerol/propylene oxide/ethylene oxide copolymer addition product
(c)Pentaerythritol/propylene oxide/ethylene oxide copolymer addition product tionality, particularly 2 functionality, i.e. the diols and the diamines, examples of which are ethylene glycol, propylene glycol, propanediol, butanediol, hydroquinone, hydroxyethylquinone ether, methylenebis-(o-dichloroaniline), quadrol, ethylenediamine and triethanolamine, of which preferred are the straight chain alkylene diols, particularly ethylene glycol or 1,4-butanediol.

On the other hand, usable as the organic polyisocyanates are those which are usually used in the urethane elastomers. Examples are such polyisocyanates as 4,4'-diphenylmethanediisocyanate (MDI), naphthylenediisocyanate (NDI), tolylenediisocyanate (TDI) and hexamethylenediisocyanate. These can also be used as mixtures of two or more thereof. Of these polyisocyanates, preferred are the aromatic diisocyanates such as MDI, NDI and TDI, particularly preferred being MDI. Rather using MDI it its crude state, it is advantageously used in its pure state.

Again, the polyisocyanate can also be used as a precursor, i.e. a prepolymer or a semiprepolymer, condensed in advance with the foregoing polyether polyol. In either case, the organic polyisocyanate is advantageously used in an amount, expressed as the NCO index, of 90–110, preferably 95–105.

Water can be used as the blowing agent in producing the microcellular polyurethane elastomer of this invention. While the amount of the blowing agent required for obtaining the polyurethane elastomer having a bulk density of 0.3–0.9 g/cm$^3$ as intended by the instant invention can be readily determined by those skilled in the art, the amount of blowing agent usually ranges from $3.3 \times 10^{-4}$ to $4.4 \times 10^{-3}$ grams per unit weight (g) of the polyurethane elastomer to be obtained.

As the urethanation catalyst, those usually used in the urethanation reaction, i.e. the tertiary amine compounds and the organometallic compounds, can be used. Examples include such compounds as triethyleneamine, diazabicycloundecene, n-methylmorphine, N,N,-dimethylethanolamine, tin octylate and dibutyl tin laurate. While the amount of catalyst used can be varied over a wide range in accordance with the reaction speed desired, it must be suitably adjusted in accordance with the amount of polyurethane elastomer to be foamed and the atmospheric conditions (temperature and humidity). This amount can be easily determined.

The invention microcellular polyurethane elastomer can suitably contain a foam stabilizer such as a silicone-type surface active agent. It can also contain such pigments as carbon black.

The several components described hereinbefore can be reacted by methods which per se are known. For example, the liquids A and B of the following compositions, after intimate mixing, are poured into a suitable mold where foaming and cure of the elastomer is allowed to proceed. This foaming and cure can usually be performed at room temperature, but it can also be carried out while heating the mixture to a temperature up to about 70° C. The foaming and cure is completed in roughly 1–2 hours, after which the resulting elastomer can be removed from its mold.

| Composition of liquid A | |
|---|---|
| Polyether polyol (a glycerol/propylene oxide/ethylene oxide copolymer addition product; number average molecular weight = 6500) | 1000 parts by weight |
| Ethylene glycol (chain extender) | 0.5–20 parts by weight |
| Water (blowing agent) | 0.1–1.5 part by weight |
| Foam stabilizer (e.g. a silicone-type surface active agent) | 0.1–1 part by weight |
| Triethylenediamine (urethanation catalyst) | 0.1–0.5 part by weight |
| Composition of liquid B | |
| Polyisocyanate/polyether polyol prepolymer (e.g. an isocyanate terminated precursory condensation product of 4,4'-diphenyl-methanediisocyanate and the above polyether polyol; free NCO content = 16 wt. %) | NCO Index 90–110 |

A vibration isolator consisting of a microcellular polyurethane elastomer can be thus obtained. A major portion of the bubbles in the microcellular polyurethane elastomer thus formed are independent bubbles. The desirable properties of this elastomer are as follows:
(1) Bulk density:
  0.3–0.9 g/cm$^3$, preferably 0.65–0.85 g/cm$^3$.
(2) Tensile strength:
  At least 5 kg/cm$^2$, preferably 6–15 kg/cm$^2$.
(3) Spring constant:
  At least 0.1 ton/cm, preferably 0.5–1.5 ton/cm.
(4) Permanent compression set:
  25% at the most, and preferably not more than 15%.
(5) Fatigue strength:
  2.0 mm at the most, and preferably not more than 1.0 mm.

Another superior characteristic that the vibration isolator consisting of the microcellular polyurethane elastomer provided by this invention possesses is its temperature characteristic. To wit, as can been seen from the hereinafter given examples of the invention vibration isolator, the changes in spring constant and hardness due to temperature changes are very small. In addition, it possesses superior weatherability. Hence, it is especially suitable for use outdoors where the fluctuation in temperature is especially great.

The microcellular polyurethane elastomer of this invention can demonstrate its superior effects when it is integrally formed and foamed on a base that supports a vibration producing source, for example, a concrete block, and thus achieve its intimate adhesion thereto. Or, it can be separately molded and then be secured to the vibration producing source by intimately adhering it to the base. It thus can be adhered to the bottom of the base with an adhesive, or a method can be employed in which a boxlike urethane elastomer product is molded followed by inserting the base in the so molded box.

The base having a polyurethane elastomer covering layer, the invention vibration isolator, as described above, can then be fitted in a recess in the surface of the floor where the vibration producing source is to be installed. The recess may be formed in advance in the floor surface, or an alternative procedure is to install the base having the polyurethane elastomer covering layer on a flat floor surface, after which the sides of base are packed with concrete or asphalt to form the recess. Again, it is also possible to lift the covered base temporarily from the floor surface and pack the bottom and sides of the base with concrete or asphalt. Again, it is possible to use a base not having a covering layer and a recess provided in advance in the floor surface and foam and mold the polyurethane elastomer in the recess by pouring a liquid thereof into the recess. In this case the polyurethane elastomer is integrally formed on both the base and the supporting floor surface, with the consequence that a firm adhesion can be obtained.

The vibration isolator of the invention can be used in all areas of industry for the purpose of isolating vibration or absorption of sound that accompany vibration. For example, conceivable applications are that of installing the invention vibration isolator at the bottom surface of punch presses for stamping out metals or at the underside of compressors, or that of isolating the vibration of air conditioning equipment that has been installed on the floor surface, or using it for isolating the vibration of subway tracks.

The following examples will serve to illustrate modes of practicing the present invention.

EXAMPLE 1

| Composition of liquid A | |
|---|---|
| Polyether polyol | 100 parts by weight |
| (a glycerol/propylene oxide/ethylene oxide copolymer addition product; average number of functional groups = 3.0; number average molecular weight as shown in Table 1, below) | |
| Ethylene glycol | As indicated in Table 1 |
| Water | 0.35 part by weight |
| Foam stabilizer | 0.50 part by weight |
| [silicone-type surface active agent (CF 2080, a product of Toray Silicone Company)] | |
| Triethylenediamine | 0.20 part by weight |
| Composition of liquid B | |
| Polyisocyanate/polyether polyol prepolymer (an isocyanate terminated percursory condensation product of 4,4'-diphenylmethanediisocyanate and the above polyether polyol; free NCO content = 16 wt. %) | NCO Index = 97 |

The liquids A and B of the above compositions were mixed with stirring at room temperature, after which the mixture was poured into a form having the dimensions 200×200×25 mm and foamed such that its bulk density would become 0.8 g/cm³. About one hour after the pouring, the form was removed, and the resulting panel-like test specimen was submitted to tests for its physical properties. The results of measurements of its physical properties are shown in Table 1.

TABLE 1

| | Run No. 1-1 | Run No. 1-2 | Run No. 1-3 | Run No. 1-4 | Physical property test method |
|---|---|---|---|---|---|
| Number average molecular weight of polyether polyol | 3000 | 4800 | 6600 | 9000 | — |
| Amount used of ethylene glycol (wt. part) | 2.47 | 2.29 | 2.21 | 2.16 | — |
| Physical property test items | | | | | |
| Tensile strength (kg/cm²) | 9.6 | 7.8 | 7.5 | 8.3 | (1) |
| Spring constant (ton/cm) | 1.1 | 0.83 | 0.72 | 0.60 | (2) |
| Permanent compression set (%) | 36 | 5.6 | 8.3 | 42 | (3) |

TABLE 1-continued

| | Run No. 1-1 | Run No. 1-2 | Run No. 1-3 | Run No. 1-4 | Physical property test method |
|---|---|---|---|---|---|
| Fatigue strength (mm) | 2.8 | 0.52 | 0.68 | 3.3 | (4) |

Notes.-
(1) Measured in accordance with JIS Method K6301. Dumbbell test pieces are prepared by cutting out the pieces in parallel to the foaming direction and perpendicular to the skin surface, and the measurement is made at a pulling speed of 500 mm/min.
(2) Determined in accordance with JIS Method K6385. A specimen (100 × 100 × 25 mm thick) is precompressed twice at a rate of 1 mm/min in its thickness direction. The amounts of strain at loads of 0.1 ton and 0.4 ton are determined from the load-strain curve of the third compression, and the value of the spring constant is obtained by the following equation.

Spring constant (ton/cm) = $\frac{0.4 - 0.1}{\delta(0.4) - \delta(0.1)}$ where $\delta(0.4)$ = the amount of strain (cm) at a 0.4 ton load, and $\delta(0.1)$ = the amount of strain (cm) at a 0.1 ton load.
(3) Determined in accordance with JIS Method K6301. A specimen of the dimensions 50 × 50 × 25 mm is compressed 30% and left to stand at 70° C. for 22 hours. The permanent compression set is then calculated from the resulting residual strain by the following equation.

Permanent compression set (%) = $\frac{t_0 - t_2}{t_0 - t_1} \times 100$ where $t_0$: thickness of test piece before compression; $t_1$: thickness of spacer; and $t_2$: thickness of test piece 30 minutes after the compression test.
(4) Measured in accordance with SRIS Method 3502.A specimen of the dimensions 50 × 50 × 25 mm is repeatedly compressed 10⁶ times at a frequency of 5Hz and a repeated displacement amplitude of 4 mm ± 2 mm. The amount of fatigue is then measured.

EXAMPLE 2

| Composition of liquid A | |
|---|---|
| Polyether polyol | 100 parts by weight |
| (average number of functional groups and composition as indicated in Table 2, below; weight = 4800) | |
| Ethylene glycol | As indicated in Table 2, below. |
| Water | 0.35 part by weight |
| Foam stabilizer | 0.50 part by weight |
| [a silicone-type surface active agent (CF-2080, a product of Toray Silicone Company)] | |
| Triethylenediamine | 0.20 part by weight |
| Composition of liquid B | |
| Polyisocyanate/polyether polyol prepolymer (the same as that used in Example 1) | NCO Index = 97 |

The liquids A and B of the above compositions were reacted as in Example 1 to obtain panel test pieces. The physical properties of these test pieces were measured, with the results shown in Table 2, below.

TABLE 2

| | Run No. 2-1 | Run No. 202 | Run No. 203 |
|---|---|---|---|
| Average number of functional groups of the polyether polyol used | 2(a) | 3(b) | 4(c) |
| Amount used of ethylene glycol (parts by weight) | 2.20 | 2.29 | 2.39 |
| Physical property test items | | | |
| Tensile strength (kg/cm²) | 4.2 | 8.8 | 10.2 |
| Spring constant (ton/cm) | 0.63 | 0.83 | 1.22 |
| Permanent compression set (%) | 28 | 5.6 | 31 |
| Fatigue strength (mm) | 2.2 | 0.52 | 2.4 |

Notes.
(a) Propylene glycol/propylene oxide/ethylene oxide copolymer addition product
(b) Glycerol/propylene oxide/ethylene oxide copolymer addition product
(c) Pentaerythritol/propylene oxide/ethylene oxide copolymer addition product

EXAMPLE 3

| Composition of liquid A | |
|---|---|
| Polyether polyol (a glycerol/propylene oxide/ ethylene oxide copolymer addition product; average number of functional groups = 3.0, number average molecular weight = 5200) | 100 parts by weight |
| Ethylene glycol | As shown in Table 3 |
| Water | 0.35 part by weight |
| Foam stabilizer (a silicone-type surface active agent CF-2080) | 0.50 part by weight |
| Triethylenediamine | 0.20 part by weight |
| Composition of liquid B | |
| Polyisocyanate/polyether polyol prepolymer (an isocyanate-terminated percursory condensation product of 4,4'-diphenylmethanediisocyanate and the above polyether polyol; free NCO content = 16 wt. %) | NCO Index = 97 |

The liquids A and B of the above compositions were reacted as in Example 1 to obtain panel test pieces. The physical properties of these test pieces are shown in Table 3.

TABLE 3

| | Run No. 3-1 | Run No. 3-2 | Run No. 3-3 |
|---|---|---|---|
| Amount used of ethylene glycol (part by weight) | 0.83 | 2.27 | 23.0 |
| (Equivalent concentration of ethylene glycol) | $(0.2 \times 10^{-3})$ | $(0.5 \times 10^{-3})$ | $(2.2 \times 10^{-3})$ |
| Physical property test items | | | |
| Tensile strength (kg/cm$^2$) | 3.2 | 7.6 | 18.2 |
| Spring constant (ton/cm) | 0.09 | 0.78 | 3.21 |
| Permanent compression set (%) | 37 | 6.2 | 45 |
| Fatigue strength (mm) | 1.5 | 0.48 | 2.6 |

EXAMPLE 4

| Composition of liquid A | |
|---|---|
| Polyether polyol (a glycerol/propylene oxide/ ethylene oxide copolymer addition product; average number of functional groups = 3.0, number average molecular weight = 4800) | 100 parts by weight |
| Ethylene glycol | 2.27 parts by weight |
| Water | 0.14–1.2 parts by weight |
| Foam stabilizer (a silicone-type surface active agent CF-2080) | 0.50 parts by weight |
| Triethylenediamine | 0.20 part by weight |
| Composition of liquid B | |
| Polyisocyanate/polyether polyol prepolymer (an isocyanate-terminated percursory condensation product of 4,4'-diphenylmethanediisocyanate and the above polyether polyol; free NCO content = 16 wt. %) | NCO Index = 97 |

The liquids A and B of the above compositions were reacted as in Example 1 to give panel test pieces having the bulk densities 0.3–0.9. The results of measurement of the spring constants of these test pieces are shown in Table 4.

TABLE 4

| Bulk density (g/cm$^3$) | Spring constant (ton/cm) |
|---|---|
| 0.3 | 0.1 |
| 0.4 | 0.15 |
| 0.5 | 0.2 |
| 0.6 | 0.35 |
| 0.7 | 0.65 |
| 0.8 | 0.9 |
| 0.9 | 1.5 |

EXAMPLE 5

The liquids A and B of the same composition as in Run No. 1-2 of Example 1 were used, and a panel having the dimensions 200×200×25 mm was prepared by operating as in Example 1. A test piece measuring 100×100×25 mm was cut out from the foregoing panel, and its loadstrain relationship was determined by the method described below. The results are shown in Table 5, below.

TABLE 5

| Strain (%) | Static load (ton) |
|---|---|
| 0 | 0 |
| 10 | 0.18 |
| 20 | 0.35 |
| 30 | 0.54 |
| 40 | 0.73 |
| 50 | 0.90 |
| 60 | 1.22 |

Measurement of load-strain:

In the same way as in the measurement of the spring constant, a static compression load is exerted, and the load-strain is determined from the resulting load-strain curve.

As apparent from Table 5, the microcellular polyurethane elastomer of this invention has an elastic recovery that is practically 100% up to a strain of 50%.

The foregoing test piece was also measured for its changes in spring constant and hardness (measured with a rubber hardness tester type C manufactured by Kobunshi Keiki Co., Ltd., Japan) ascribable to changes in temperature. The results obtained are shown in Table 6, below.

TABLE 6

| Temperature (°C.) | Spring constant (ton/cm) | Hardness (degree) |
|---|---|---|
| −50 | 4.3 | 72 |
| −40 | 1.1 | 66 |
| −30 | 0.71 | 60 |
| −20 | 0.70 | 59 |
| −10 | 0.68 | 58 |
| 0 | 0.65 | 58 |
| +10 | 0.65 | 58 |
| +20 | 0.65 | 57 |
| +30 | 0.64 | 58 |
| +40 | 0.65 | 57 |
| +50 | 0.65 | 59 |
| +60 | 0.64 | 58 |
| +70 | 0.64 | 58 |

EXAMPLE 6

The liquids A and B of the same composition as in Run No. 1-2 of Example 1 were used, and a panel having the dimensions 200×200×25 mm was prepared. A sample of 5-mm thickness for use in the tensile test was prepared from the foregoing panel, and a test piece thereof was placed in an ozone aging tester (Model OM-2 manufactured by Suga Shikenki Co., Ltd., Japan) in a 50% elongated state and was exposed to an atmosphere of an ozone concentration of 70 pphm for 200 hours to check the state of crack formation at 50% elongation. No abnormality was noted.

In contrast, cracks formed in natural rubber, nitrile rubber and chloroprene rubber after respectively 40, 48 and 70 hours.

We claim:

1. A vibration isolator consisting essentially of a microcellular polyurethane elastomer having a bulk density of 0.3–0.9 g/cm$^3$, a tensile strength of at least 5 kg/cm$^2$, a spring constant of at least 0.1 ton/cm, a permanent compression set of 25% at the most, and a fatigue strength of 2.0 mm at the most, said polyurethane elastomer obtained by reacting in the presence of water as the blowing agent
   (a) an organic polyisocyanate,
   (b) a polyether polyol having an average number of functional groups of 2.5–3.5 and a number molecular weight of 4500–8500, and which is obtained by addition polymerizing ethylene oxide and propylene oxide with a lower aliphatic polyhydric alcohol of 2–6 carbon atoms or with a low molecular weight active hydrogen-containing compound containing at least two active hydrogen atoms, and
   (c) a chain extender, in such a ratio that the NCO index is 90–110 and the concentration of the chain extender, based on the total weight of the three components (a), (b), and (c) is $0.4 \times 10^{-3}$ to $2.0 \times 10^{-3}$ equivalent/gram.

2. A vibration isolator of claim 1 wherein said organic polyisocyanate is 4,4'-diphenylmethanediisocyanate.

3. A vibration isolator of claim 1 wherein said polyether polyol has an average number of functional groups of 2.8–3.3 and a number average molecular weight of 4500–6500.

4. A vibration isolator of claim 1 wherein said chain extender is a straight chain alkylene diol of 2–6 carbon atoms.

5. A vibration isolator of claim 1 wherein the concentration of said chain extender is $0.4 \times 10^{-3}$ to $1.0 \times 10^{-3}$ equivalent/gram.

6. A vibration isolator of claim 1 wherein the bulk density of said microcellular polyurethane elastomer is 0.65–0.85 g/cm$^3$.

7. A vibration isolator according to claim 3 wherein said chain extender is a straight chain alkylene diol of 2–6 carbon atoms and is present in a concentration of $0.4-10^{-3}$ to $1.0 \times 10^{-3}$ equivalent/gram; said microcellular polyurethane elastomer having a bulk density of 0.65–0.85 g/cm$^3$.

8. A vibration isolator according to claim 1 wherein the polyether polyol is obtained by addition polymerizing ethylene oxide and propylene oxide with said lower aliphatic polyhydric alcohol of 2–6 carbon atoms.

9. A vibration isolator according to claim 1 wherein said polyether polyol is obtained by addition polymerizing ethylene oxide and propylene oxide with said low molecular weight active hydrogen-containing compound.

10. A vibration isolator according to claim 2 wherein said chain extender is ethylene glycol or 1,4-butane diol and the amount of the organic polyisocyanate is such that the NCO index is 95–105.

11. A vibration isolator according to claim 10 wherein the polyether polyol has an average number of functional groups of 2.8–3.3 and a number average molecular weight of 4500–6500 and is obtained by addition polymerizing ethylene oxide and propylene oxide with a lower aliphatic polyhydric alcohol of 2–6 carbon atoms selected from the group consisting of glycerol, propylene glycol, pentaerythritol, and trimethylol propane.

12. A vibration isolator according to claim 11 wherein the chain extender is present in a concentration of $0.4 \times 10^{-3}$ to $1.0 \times 10^{-3}$ equivalent/gram and said microcellular polyurethane elastomer has a bulk density of 0.65–0.85 g/cm$^3$.

* * * * *